Dec. 3, 1929.  D. E. JEWITT  1,738,433

POWER SYSTEM

Filed Dec. 27, 1926

Inventor:
Dennis E. Jewitt,
by
His Attorney.

Patented Dec. 3, 1929

1,738,433

UNITED STATES PATENT OFFICE

DENNIS E. JEWITT, OF RUGBY, ENGLAND, ASSIGNOR TO GENERAL ELECTRIC COMPANY, A CORPORATION OF NEW YORK

POWER SYSTEM

Application filed December 27, 1926, Serial No. 157,272, and in Great Britain January 26, 1926.

My invention relates to power systems and has as an object the provision of a simple and reliable energy absorbing means which comes into operation before the power returned to the generator as a result of using regenerative braking exceeds that which can be dissipated by the generating set without causing it to be rotated at an excessive speed.

In order to illustrate my invention, I will describe one method of carrying it into effect in an electric ship propulsion system of the constant current type such as is shown in my British Patent #226,960 for "improvements in and relating to systems of electric ship propulsion". It is of course understood, however, that the scope of my invention is not limited to the application described, but is of general application. For example, the invention may be applied in electrically equipped hoisting cranes, grab buckets, dipper dredges, suction dredges, material handling machines, machine tools, etc.

When bringing about a reversal in the direction of a vessel, it is necessary to first of all bring the propeller to rest and then cause it to rotate in the reverse direction. When bringing the propeller to rest the action of the water flowing against it due to the forward momentum of the vessel causes the propeller to maintain a forward rotation and it has been found that the braking power is usually at its maximum when the propeller is slowed down to about 35% of its original forward speed. At this particular point the braking torque is approximately 100% of the original full forward speed torque in some classes of ships. In such a case provision has to be made for the dissipation of braking power which is returned to the system amounting to approximately 35% of the full power of the system. The above consideration assumes a fairly rapid reversal but even if the reversing period is prolonged the braking power is still of a high order.

Figure 1:
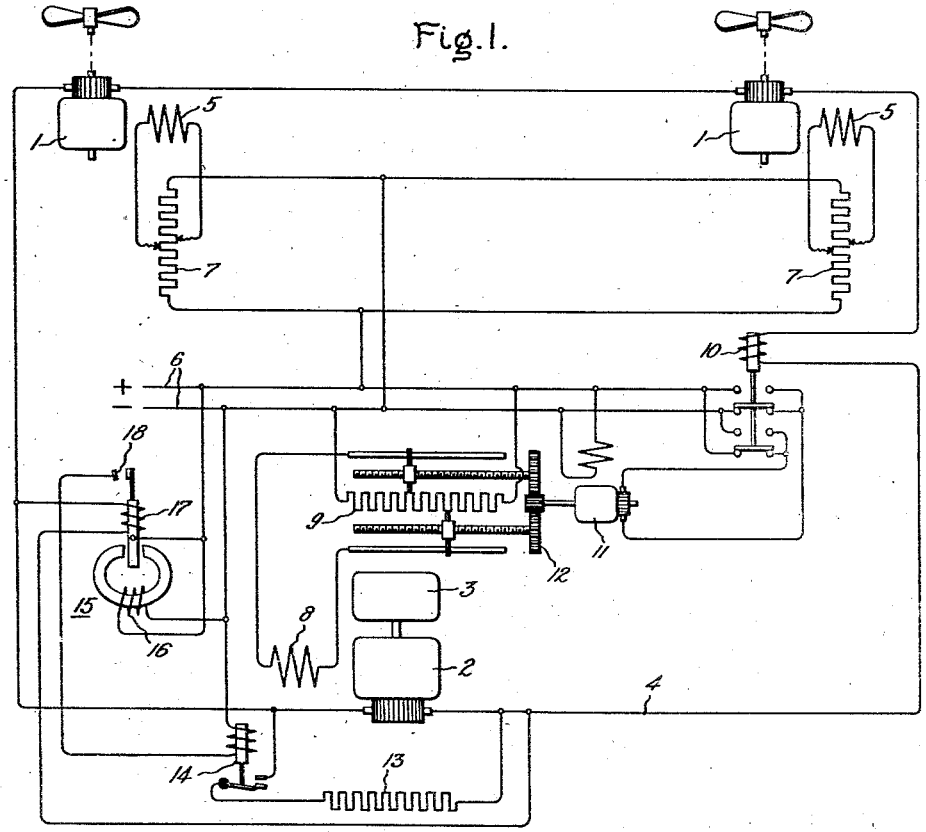
Figure 2:
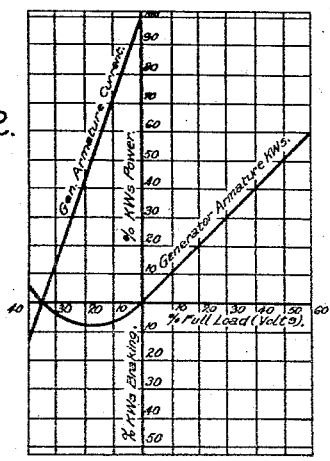
Figure 3:
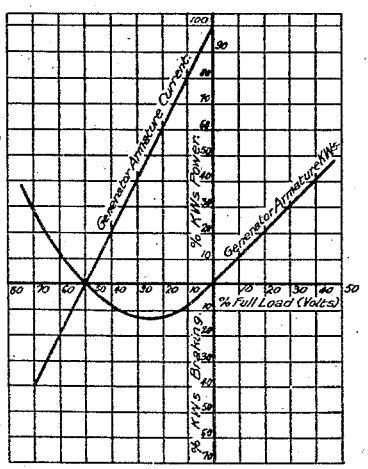

In the drawing, Fig. 1 diagrammatically represents the application of my invention to a ship propulsion system, and Figs. 2 and 3 are graphic curves illustrating conditions in the circuits.

In the system shown in Fig. 1, the two propeller motors 1 are connected in series and supplied with current from a generator 2 driven by a prime mover 3 through a main series circuit 4. The field 5 of each motor 1 is arranged to be excited from a supply circuit 6 and is provided with a reversing potentiometer type rheostat 7 which may be operated either directly by hand or indirectly through the agency of a suitable motor mechanism. The field 8 of the generator 2 is arranged to be excited from the supply circuit 6 through a reversing rheostat 9. A current relay 10 in the main series circuit 4 is adapted to control a motor 11 which is energized from the excitation supply circuit 6 and arranged to operate the field rheostat 9 of the generator field through the medium of gearing 12. The motor 11 may be replaced by a solenoid or by any other convenient operating device. The relay 10 is adapted to automatically maintain a predetermined full load current in the series system.

With this arrangement the motors 1 can be started up independently of each other by the application of exciting current to their field windings 5 and the motor speeds varied by varying the field excitation so that one propeller may rotate at a speed differing from that of the other propeller which may even rotate in the reverse direction, as will appear from a consideration of my British Patent, #226,960.

In the illustrated embodiment of my invention the energy absorbing means is shown as a resistor 13 which is arranged to be connected across the armature of generator 2 by means of a solenoid operated contactor 14 which is under the control of relay 15 responsive to a characteristic of the generator 2. This relay is shown as a polarized relay which is provided with two coils one of which, 16, is connected across the constant voltage supply circuit 6 and the other of which, 17, is connected across the generator armature. The arrangement is such that when the propeller motors 1 upon being slowed up during the process of reversal cause by reason of the constant current regulation of the system the generator voltage and power to pass through zero, the polarized relay 15 energizes the solenoid operated contactor 14, by completing its circuit across the supply circuit 6 at the relay contacts 18, which switches in the energy absorbing resistance 13 in parallel with the generator 2 which then in conjunction with the generator absorbs energy returned from the propeller motors. While I prefer to use a resistance as the energy absorbing device, other electrical or mechanical energy absorbing devices may be used without departing from my invention in its broader aspects.

In describing the operation of this system, it will be assumed that provision has been made for dissipating braking energy equal to 35% of the total power of the generating set and that it is necessary to limit the braking power which is arranged to "motor" the generator to say 10% of its total output or otherwise the generating set will commence to race.

In order to meet these particular conditions, resistance 13 will have a value such that with 35% full load volts across its terminals it will pass the normal line current which is constant irrespective of load in the illustrated system. This resistance will be referred to as a 35% resistance. When the propeller motors are slowed down the voltage across the generator 2 is automatically reduced by the regulator 10 so as to maintain the current in the system constant as described in my British Patent #226,960. When the point is reached where the voltage is at zero across the armature of generator 2, relay 15 operates to insert the 35% resistance 13 in parallel with generator 2. At this point the current circulating in resistance 13 will be substantially zero. A further slowing up of the propeller motors 1 will cause the voltage to build up in the reverse direction in generator 2 due to the action of the automatic field control of the constant current regulator. This causes the main circuit current to divide between the parallel paths offered by the generator armature and the resistance 13 respectively and the main circuit current is gradually diverted from the armature circuit of generator 2 until the whole of the regenerative power current flows through the resistance 13. At this point the armature voltage of generator 2 is at 35% of full power volts in the reverse direction and the whole of the regenerative braking energy is dissipated in resistance 13.

This condition is shown graphically by the curves of Fig. 2. One of these curves shows how the braking energy in kilowatts which is dissipated in rotating the prime mover generator set raises to a maximum of about 9% and then falls to zero when the full 35% regenerative energy is being dissipated in the resistance 13.

Other values of braking resistance can be used to suit different conditions and if the regenerative power is of high value, say 75%, it may be found desirable to use a lower percentage braking resistance in order to reduce the braking energy dissipated in rotating the generator 2 and its connected prime mover and allow the generator to come under load under maximum braking conditions. The curves in Fig. 3 show the results of using a 50% resistance where a 75% regenerative braking condition occurs.

In the above examples the electrical losses in the motors and cables have been neglected in order to simplify the description, but in practice these will be found appreciably to effect results and allow of a reduction in the capacity of the braking resistance.

The invention is not limited to the particular form of relay illustrated and described. The sensitiveness of the relay 15 is not of great importance and if the relay functions with the generator volts within 5% of full volts on either side of zero, it will have no appreciable effect on the system. If the relay closes late, it means that the maximum braking power returned to the generating set cannot be set less than 5% of the full forward power.

I have explained my invention by illustrating and describing a certain specific embodiment thereof, but it will be readily understood by those skilled in the art that the arrangement of this embodiment may be modified in certain of its details and I, accordingly, do not wish to be restricted to the particular arrangement disclosed herein by way of illustration for the purpose of setting forth my invention in accordance with the patent statutes. The terms of the appended claims are, therefore, intended to cover all changes and modifications within the true spirit and scope of my invention.

What I claim as new and desire to secure by Letters Patent of the United States, is:—

1. In combination, a generating set comprising a generator, a load motor adapted to operate as a generator for dynamic braking having its armature in series relation in a local circuit with the armature of said generator, means responsive to the current in said local circuit for maintaining the current therein substantially constant, energy absorbing means, and means for applying said energy absorbing means to the generating set approximately when the power passes through zero during regenerative braking.

2. In combination, a separately excited generator, a load motor adapted to operate as a generator for dynamic braking having its armature in series relation in a local circuit with the armature of said generator, means for adjusting the field strength of said motor, means responsive to the current in said local circuit for adjusting the field strength of said generator to maintain substantially constant the current in said circuit, an energy absorbing resistance adapted to be connected in parallel with said generator, and means responsive to a characteristic of the generator for connecting said resistance in parallel with said generator approximately when the generator power passes through zero during regenerative braking.

3. In combination, a separately excited generator, a load motor adapted to operate as a generator for dynamic braking having its armature in series relation in a local circuit with the armature of said generator, means for adjusting the field strength of said motor, means for varying the excitation of said generator automatically in response to the current in said local circuit to thereby maintain substantially constant current in said circuit, an energy absorbing resistance adapted to be connected in parallel with said generator, and a polarized relay responsive to generator voltage for connecting said resistance in parallel with said generator approximately when the voltage of the generator passes through zero.

4. A ship propulsion system comprising a prime mover, a generator driven by said prime mover, a propeller motor series connected in a local circuit with said generator, means responsive to the current in said local circuit for automatically maintaining a predetermined current in said circuit, an energy absorbing resistance arranged to be connected in parallel with said generator, and means responsive to a characteristic of said generator for inserting said resistance in parallel with the generator approximately when the generator power passes through zero during regenerative braking.

In witness whereof, I have hereunto set my hand this ninth day of December, 1926.

DENNIS E. JEWITT.